(12) United States Patent
Verrall

(10) Patent No.: US 11,614,115 B2
(45) Date of Patent: Mar. 28, 2023

(54) BOLT APPARATUS

(71) Applicant: Jeff Paul Verrall, Annandale (AU)

(72) Inventor: Jeff Paul Verrall, Annandale (AU)

( * ) Notice: Subject to any disclaimer, the term of this patent is extended or adjusted under 35 U.S.C. 154(b) by 304 days.

(21) Appl. No.: 16/613,923

(22) PCT Filed: May 17, 2018

(86) PCT No.: PCT/AU2018/050473
§ 371 (c)(1),
(2) Date: Nov. 15, 2019

(87) PCT Pub. No.: WO2018/209400
PCT Pub. Date: Nov. 22, 2018

(65) Prior Publication Data
US 2021/0404501 A1 Dec. 30, 2021

(30) Foreign Application Priority Data
May 17, 2017 (AU) .................................. 2017901836

(51) Int. Cl.
*F16B 31/02* (2006.01)
*E21D 20/00* (2006.01)
(Continued)

(52) U.S. Cl.
CPC .............. *F16B 31/02* (2013.01); *E21D 20/00* (2013.01); *E21D 21/0026* (2013.01); *F16B 31/04* (2013.01)

(58) Field of Classification Search
CPC ...... F16B 1/0071; F16B 31/02; F16B 31/028; F16B 31/04; E21D 20/00; E21D 21/0026
(Continued)

(56) References Cited

U.S. PATENT DOCUMENTS 3,550,244 A * 12/1970 Utzy ................. F16B 1/0071
29/407.05
3,851,386 A 12/1974 Ellzey, Jr.
(Continued)

FOREIGN PATENT DOCUMENTS

| CN | 1423064 A | 6/2003 |
| DE | 29821859 | 5/1999 |
| GB | 2094919 | 9/1982 |

OTHER PUBLICATIONS

International Search Report in corresponding PCT application No. PCT/AU2018/050473, dated Jul. 16, 2018, 6 pp.
(Continued)

*Primary Examiner* — Roberta S Delisle
(74) *Attorney, Agent, or Firm* — Tredecim LLC; Sean L. Sweeney

(57) ABSTRACT

The invention relates to an improved bolt apparatus for installation, the improved bolt apparatus including, a bolt having a head, shaft and an end and the head of the bolt including an improvement means. The bolt also including an engagement means, associated with the shaft, between the head and the end of the bolt, for engaging with or into a surface where the bolt is to be installed. The improved bolt apparatus may be installed into a suitable hole in the surface, and the improvement means enables the type, kind, or characteristic of the bolt to be known and or the bolt installation to be adjusted within the hole. The invention also provides many variants thereon, and methods of use.

22 Claims, 11 Drawing Sheets

(51) Int. Cl.
*E21D 21/00* (2006.01)
*F16B 31/04* (2006.01)

(58) Field of Classification Search
USPC ........................................................ 411/8, 13
See application file for complete search history.

(56) References Cited

U.S. PATENT DOCUMENTS

| | | | | |
|---|---|---|---|---|
| 3,877,411 | A * | 4/1975 | MacDonald | .......... F16C 19/525 116/207 |
| 5,165,831 | A | 11/1992 | Yager et al. | |
| 5,375,955 | A * | 12/1994 | Leslie | ................... F16B 1/0071 411/378 |
| 5,511,917 | A | 4/1996 | Dickson | |
| 5,934,852 | A * | 8/1999 | Stingl | ................... F16B 1/0071 411/372.5 |
| 6,073,552 | A * | 6/2000 | Cruse | .................... F16B 1/0071 101/32 |
| 6,095,739 | A * | 8/2000 | Albertson | ............. F16B 1/0071 411/13 |
| 6,270,302 | B1 * | 8/2001 | Lyons | ....................... B60B 3/16 411/121 |
| 6,402,447 | B1 | 6/2002 | Babak | |
| 6,695,558 | B2 * | 2/2004 | Shibata | ................... F16B 15/00 411/13 |
| 10,930,178 | B2 * | 2/2021 | Cournoyer | .............. G09F 23/00 |
| 2001/0034981 | A1 | 11/2001 | Steed et al. | |
| 2002/0187019 | A1 * | 12/2002 | Campbell | ............. F16B 1/0071 411/439 |
| 2004/0115022 | A1 * | 6/2004 | Albertson | ............... F16B 15/00 411/13 |

OTHER PUBLICATIONS

Written Opinion in corresponding PCT application No. PCT/AU2018/050473, dated Jul. 16, 2018, 9 pp.
International Preliminary Report on Patentability in corresponding PCT application No. PCT/AU2018/050473, dated Sep. 4, 2019, 74 pp.
A "Thunderbolt" climbing anchor in place on a route [retrieved from internet on Sep. 7, 2018] <URL: https://www.thebmc.co.uk/bolt-failures-on-north-wales-limestone> Published on May 29, 2013.
How to Recognize Metric and SAE Bolts [retrieved from internet on Sep. 7, 2018] <URL: http://blog.chiltondiy.com/2013/12/how-to-recognize-metric-and-sae-bolts-2/> Published on Dec. 13, 2013.
Best available translation of DE29821859, May 6, 1999, to Fabricius Fastener GMBH, 6 pp. (translation via Patent Translate Powered by EPO and Google).
Examination Report in corresponding CN application No. 201880047039.5, dated Jan. 14, 2021, 13 pp.
Examination Report in corresponding IN application No. 201917051742, dated Jul. 29, 2021, 6 pp.
English Abstract of CN1423064A, 1 pp.
Machine translation of CN1423064A description text, 5 pp.
Machine translation of CN1423064A claims, 2 pp.

* cited by examiner

BOLT APPARATUS

FIELD OF THE INVENTION

The present invention relates to an improved bolt apparatus, in particular to an improved bolt apparatus with an improvement means to assist to identify the type or kind of bolt.

Professional tradespersons have a plethora of tools and years of experience when installing concrete anchors or bolts. The DYNABOLT (Trade Mark) was designed more than 60 years ago as a manner to strongly attach, through the combination of a drilled hole and bolt, with an expandable sleeve. After a hole of exactly the right size is drilled the bolt is placed, (sometimes with an expandable sleeve and washer) and then hammered into the hole to the required depth. Once in place a torque wrench or similar is used to turn the nut (notably the nut not the bolt) onto the threaded shaft of the bolt. As the nut tightens onto the shaft the metal sleeve is compressed between the nut and base and starts to flare out. The flaring out continues against the surrounding rock or concrete until maximum torque is reached on the nut, whereby the expansion bolt is firmly anchored in place. The installed bolt is strongly held in place, resisting pulling out as due to the flanges. Two aspects of the installation are critical, that the hole is the correct depth and alignment, and that just the right amount of friction against the side of the hole is used to initiate torque.

The subject invention looks to improve, in particular, the alignment aspect of the installation, through use of rotation or anti-rotation of the bolt itself, as well as including the visual indicator that enables the installed bolt to be safety checked and quality verified, even years after installation. Records may be lost or the people involved moved on and so without the visual indication it may be impossible to know the type or kind of bolt installed and so the strength and suitability for a purpose. With the present invention the visual indicator enables the type or kind of bolt used to be indicated for the whole life of the bolt. When it comes to checking that the bolt meets current standards or to check it would still be suitable for a changed use the visual indicator is there to show the type of bolt. In this way the user can be assured of the strength and capability of a bolt, and so a decision can be made whether to replace the bolt or not. At present, only by removing the bolt can the type and kind, such as the length of the shaft be determined and so once removed the bolt will need to be replaced in any case, causing extra work.

Often anchor bolts or expansion bolts of a known form are used to suspend heavy objects, or construction pieces within a home; a secure and safe installation is therefore essential. When a Do-It-Yourself enthusiast tries to install anchor bolts at home, they often have significant issues with alignment. A poorly aligned anchor bolt is almost impossible to remove and or realign, there is no going back, as once installed rotation or anti-rotation of the bolt is simply not possible or only possible by destroying the hole. If such an attempt is made, or the bolt installed without proper alignment, the ultimate installation will not be secured properly. When the misaligned or badly made installation is under the maximum stresses in use, it may then may become loose or fail, a serious safety risk. Any widening of the hole puts the whole installation of the bolt at risk as it will no longer be strongly be maintained in the hole. In any installation where a strong bolt is needed, the installation of the object to be hung, attached or suspended needs to be absolutely strong and secure, so as to be able to be relied upon. There is no use in an unreliable bolt, and unreliable or questionable bolt installations will not be suitable where the life of a person is reliant on the integrity of the bolt.

When used in rock climbing, the life of the person is depends on a strong and safe installation, with bolts used suitable to the loads to be applied. Anchor bolts are essential in rock climbing to maintain ropes in place, so in the case of an accident the rock climber is prevented from falling. It is also usual to secure hangers or rope attachments to rock faces in order that the climber can climb up. Anchor bolts are used in all kinds of safety equipment to secure and make firm ropes or other items. These bolts need to be strongly installed and failure free, or safety is compromised and the person may fall. There is a serious and significant problem, particularly in rock climbing, of inferior quality bolts being used. These bolts may be inferior in material and so prone to failure or simply that a shaft of insufficient length is used for the particular use being made of the bolt. For example, a bolt with a short shaft, which will not penetrate the rock face sufficiently to hold securely, may be used with an intention to replace later. However, once installed it is impossible for someone else to see that the bolt used has a short shaft, is insufficient for the task and needs replacing. Budget bolts or cheap brands are a dangerous choice where the safety of the climber is reliant on the hold of the bolt.

Other problems of these types of bolts, for all non-professional installers or poorly experienced professionals, is the correct installation of the expansion bolts, whether this be in a rock climbing, construction or home use environment. It is easy to make the hole the wrong size, through use of the wrong size bit, or not making the hole straight. Poor installation may cause rotation of the bolt in the hole which weakens the installation and is undesirable. Or the rotation adjustment may be unsuitable, and may damage the sleeve or the surface in which the bolt is to be installed, which may include a special coating such as galvanising. The hole should be precisely the right size, the rotation made correctly and the expansion holds the bolt strongly in the structure. Unfortunately, this does not always occur due to the installer lacking training or experience. One problem in particular is where the bolt to hole ratio is incorrect, which enable the bolt to work loose over time. In ordinary circumstances, a drill can be used carefully to drill a neat hole of a suitable size, whereas in a rock face this is much more difficult, and may be compounded by difficult angles, weather conditions or general inconvenience.

When the anchor or expansion bolts are being installed not on a rock face but in more usual circumstances there are still many problems to be overcome for the anchor bolt to be securely installed. As mentioned the hole must be neatly and precisely drilled straight so that the anchor bolt may be properly fitted therein. The hole may become enlarged from the drill bit if the drill encounters hard aggregate or reinforcing within the concrete. Instead of drilling straight in, the hard aggregate or reinforcing will cause the drill bit to move sideways, enlarging the hole. The hole may then be an inconsistent size with the anchor bolt to be installed or the hole may be uneven in width along its length. Worn drill bits themselves can contribute to uneven hole size, and if they are very worn further work will be required to drill the hole to be big enough, which is likely to make the hole uneven or too big for the anchor bolt to be installed properly, if at all.

Another common problem is using a mix of imperial and metric drill bits and bolts, as both are commonly available. However, at the time when a person is wishing to install a particular metric bolt, for example, the only drill bit available may be a similar but not identical imperial measurement. Where the installation is at a remote location, there may be no retailer to purchase the appropriate drill bit and so rather than delay the installation a close enough drill bit is used. For urgent or other jobs where there is no time to get other drill bits or bolts, a mismatched bolt and drill bit may be used in order that the installation be made as quickly as possible.

In some instances, it is intended to make a slightly larger hole than is required, for corrosion resistance or for security to accommodate adhesive. Where the hole is bigger the reduced initial friction factors allow the bolt to rotate, which is undesirable. If the operator drills at an angle accidentally or then tries to straighten the hole, this can all lead to a hole that is too large being used, which will not be a tight fit to anchor the bolt.

In any of these examples, the bolt appears to be well installed, but there are problems with the installation and it is dangerous and prone to failure as it will not be tightly anchored. Minimal stresses may remove the bolt, or when used to secure high stress items greater forces, but still significantly less than a properly installed bolt should be able to withstand.

Another very serious problem in the industry is that once installed there is no way to see the type of bolt that is actually installed. The length of the shaft, cannot be seen and from above the heads of these bolts of different shaft lengths, materials, strengths and holding capabilities all look the same. A dangerous assumption may be made, but it cannot be known the nature of the bolt that is installed, and so the capacity to hold or carry items. The inventor has determined a new form of bolt and method of use that enables anyone, including Do-It-Yourself enthusiasts to see the types of bolt installed and be adjustably installed properly and securely.

The subject invention addresses many of the serious concerns and difficulties encountered with conventional expansion bolts. In one aspect, the ability to use a screwdriver to adjust the bolt enables proper fitting and correction, should it be necessary, at the time of installation or later. As time and conditions change adjustment to the bolt installation may be made with a spanner and screwdriver as described further below. The properly fitted bolt is not only stronger and safer but also more aesthetically pleasing. Even if use of a hammer is necessary to seat the bolt, the additional use of a screwdriver in the subject invention prevents burring and again gives a safer and better installation, over known bolts. It may be, in high vibration environments, such as at a mine site or industrial location for example, that the bolt or nut may become loosened over time. In this circumstances it is easy, through use of the subject invention to see that unintended rotation has occurred through the alignment of the slot and quickly act to realign and tighten the bolt. Regular checks on the bolts can enable the condition of the bolts to be seen and acted upon before the bolt becomes loose and dangerous. There are numerous advantages to the invention, through the combination of functional head, and visual indications as to the state, type or kind of bolt.

The inventor has developed the first significant change to an anchor bolt for 60 years, by introduction of a means to adjust the bolt after installation and a visual indicator, to indicate the nature of the installed bolt and also the alignment. The improved bolt apparatus of the invention is a surprisingly significant advance over the prior art, which improves installation, usability and safety in the long and short term. An audit of the types of bolt apparatus installed can readily see that a suitable bolt is installed or where replacement is required. No longer need a climber rely on the belief that the bolt is of sufficient quality or length of shaft, this can be seen from a quick inspection. Further the installation, using the improved bolt can be trusted to be stronger and safer due to the rotation or anti-rotation possible to the bolt itself to adjust and allow for installation issues. There are a great many advantages and features to this very clever invention, which are likely to be readily adopted by the industry on it being made public. The standardisation for safety purposes is a great advantage as it will be possible for safety checks, or a safety audit, on the anchor bolts to be made after installation to ensure that they meet the particular safety standards and strength capacity.

It is anticipated that prequalification standardisation and verification code requirements will increase over time and in particular to match systems operating in USA and Europe. Use of the invention will be most advantageous in enabling safe installation that can be verified at the time of installation and also later.

BACKGROUND OF THE INVENTION

The following describes non-limiting examples of the invention being used with reference to an anchor bolt, in part for use in rock climbing. Due to the safety issues with the installation and safe maintenance of anchors in rock climbing this is a particularly suitable application. Once installed the visual indicator on the head of the bolt will always be able to be readily checked to give the user confidence in the strength of the bolt. However, the invention can be used for any suitable anchor or expansion bolt application or other suitable applications, as would be understood, due the very useful nature of the invention. It is not intended to limit the scope of the invention, in any way to rock climbing, other than as limited in the claims. Further, the clever features of the invention the adjustability and the visual indication as to the kind or nature of the invention may also be used with other types of bolts, where suitable. It is not intended to limit the bolt to an expansion or anchor bolt, other than as specifically claimed.

For clarity, any prior art referred to herein, does not constitute an admission that the prior art forms part of the common general knowledge, in Australia or elsewhere.

It is an object of the present invention to provide an improved bolt apparatus that at least ameliorates one or more of the aforementioned problems of the prior art. It is a further object of the present invention to provide a method of use of an improved bolt apparatus that at least ameliorates one or more of the aforementioned problems of the prior art.

DISCLOSURE OF THE INVENTION

Accordingly, the present invention provides an improved bolt apparatus for installation in a surface, the improved bolt apparatus including:
  a bolt having a head, shaft and an end and the head of the bolt including an improvement means;
  an engagement means, associated with the shaft, between the head and the end of the bolt, for engaging with or into a surface where the bolt is to be installed,
wherein, the improved bolt apparatus may be installed into a suitable hole in the surface and engaged by the engagement means, and the improvement means enables the type, kind, or characteristic of the bolt to be known and or the bolt installation to be adjusted within the hole.

Accordingly, the present invention provides, in a variant, an improved bolt apparatus for installation in a surface, the improved bolt apparatus including:

a bolt having a head, connected to a shaft with an end;

an improvement means, in the head of the bolt, the improvement means including a visual indicator means, and an adjustment means;

an engagement means, associated with the shaft of the bolt, for engaging with or into the surface to install the bolt, wherein, the improved bolt apparatus may be installed into a suitable hole in the surface, engaged by the engagement means, and the visual indicator means enables the type, kind, or characteristic of the bolt to be seen, and the adjustment means enables the bolt installation to be adjusted through rotation or anti-rotation, within the hole, and the visual indication and adjustment means can both be used at the time of installation and later, after the bolt has been installed to see the characteristic of the bolt and to adjust the installation of the bolt in the hole.

Preferably, the improvement means includes a visual indicator means which readily indicates one or more characteristic of the bolt to the user. Preferably, the visual indicator means easily indicates the type or kind of the bolt to the user. Preferably, the improvement means includes an adjustment means to enable adjustment of the installed bolt. The improvement means may include a plurality of improvements with beneficial functionality including one or more of visual indicator means, adjustment means or other forms. The visual indicator means and the adjustment means may be the same parts of the improvement means. There may be multiple features to the improvement means, some may be visual indicator means, and or some may be adjustment means and or some may have other improvement functions. For example, one or more slots to enable adjustment and indicate length of shaft and dots or arrowheads to indicate a clock face reading. In some forms of the invention a single improvement means may be included. In this form of the invention the single improvement means may act as either a visual indicator, adjustment means or both. Most preferably, the improvement means includes both a visual indicator to one or more type, kind or characteristics of the bolt and a means to enable adjustment once installed. Most preferably, the length of shaft of the bolt is indicated by the visual indicator means. Most preferably, the adjustment is the rotation or anti-rotation of the bolt within the surface to adjust the installation. Each of these features is novel and inventive in itself, it is believed. In combination, however there is a further invention of an extremely useful bolt for improved long term safety and improved installations.

Preferably, the adjustment means enables rotation and or anti-rotation of the bolt shaft to adjust the installation. The adjustment means may be the readily recognisable visual indicator. The adjustment means and the visual indicator may be the same as one another or may be different. Preferably, the adjustment means is included and a separate readily recognisable visual indicator. In this form of the invention preferably the rotation means is a slot for receipt of a screwdriver. Any suitable slot or recess may be used instead that enables rotation of the bolt within the hole. Preferably, in this form of the invention the readily recognisable visual indicator includes means to show the length of shaft of the bolt. Preferably, a clock arrangement is used to indicate the length of shaft.

The bolt may be made of any suitable material or combination of materials. The bolt may be made of metal. The bolt may be made of a high tensile material. The bolt may be made of high tensile metal. The bolt may be made of high tensile steel. The bolt may be made of strong steel. The bolt may be made of an extremely strong material. A protective coating may be included. A protective coating may be included to protect the bolt from corrosion. A decorative finish may be applied to the bolt. The visual indication means may include means to indicate if the material of the bolt is high tensile or not. Other indications can be used to indicate the material and hence the strength of the bolt through use of the visual indication means. The improvement means may be made of other materials applied to the head of the bolt, or may be formed in the bolt head. Most preferably, the head of the bolt is adapted to including improvement means added during manufacture.

The surface may be any suitable surface where it may be desired to install the bolt. For example, a rock surface when used in rock climbing. The surface may be a wall, roof, floor or ceiling. The surface may be any flat surface. The surface may be any area where a bolt can be installed. In particular, the surface may be any surface where it is desirable to install an anchor type expansion bolt.

The bolt head may take any suitable form. The bolt head may appear as a conventional bolt head but adapted to include the improvement means and there have the increased functionality of being adjustable and visual inspection enables the characteristic of the bolt to be readily determined. The bolt head may be domed. The bolt head may be flat. The bolt head may have any suitable shape to suit the particular application. The bolt head may include cut-outs. The cut-out portions may take any suitable shape. The cut-outs may assist to visually determine the nature of the bolt. For example, the cut-outs on this kind of bolt may indicate a high tensile bolt. The cut-outs may be functional. The cut-outs may assist in flow of water or reduction in corrosion due to water siting on the head of the bolt.

The bolt shaft may take any suitable form. The bolt shaft may include threading, in some uses of the invention. The engagement means, in this form of the invention may include the threading of the shaft. As previously stated, the invention is most applicable to expansion bolts and their use, but any kind of bolt may be used with some or all aspects of the invention. Most preferably, the bolt shaft is part of an anchor bolt or expansion bolt. The bolt shaft may take any suitable length. The bolt shaft may be chosen from the group less than 2 inch, 3 inch, 4 inch, 5 inch, 6 inch, 7 inch, 8 inch, 9 inch, 10 inch, 11 inch, 12 inch, 13 inch and their metric equivalents. Half inch measures may also be included. Any suitable length under the imperial system may be used instead, including whole, half and quarter sizes. The bolt lengths may also be any suitable length in millimetres. The length of shaft under the metric system may be any suitable length, as would be readily understood by the person skilled in the art. The invention may be adapted to indicate lengths of shaft under any suitable measuring system. Different cultures and societies have developed many different forms of measuring and it is intended that the invention may be used for any of these measuring systems. The indication on the head of the bolt will be evident to the user as to the length of shaft, under imperial or metric systems. The bolt shaft may be any suitable length. Under the imperial system inches are used as a convenient division of length. Metric is of course more commonly used in many countries, and by some users. The invention is not limited to the particular system used, inches are used in the subject specification as an example. Other systems of measure could readily be used with adaptation to the system.

The bolt is formed of the head with a shaft attached to the head at one end and the shaft having an end at the other. Preferably, the connection is that the bolt head and shaft are made integrally. The end of the bolt may be any suitable end. The end may form part of the engagement means. For example, where the end is flanged. The end may be flat, pointed or any other suitable shape. Preferably, the engagement means includes one or more part of the bolt and is associated therewith to strongly maintain the bolt in the hole in the surface once installed.

The improvement means may take any suitable form. The improvement means may be a number of features considered together, each with different functions. Some of the functions may be the same some may be different, for example a group of features of the improvement means may each visually indicate the characteristic of the bolt, each indicating different things which when taken together conveys a lot of information.

Preferably, the improvement means includes the adjustment means and one or more other features which may be used to visually identify features of the bolt. Most preferably, one of these features is the length of the shaft of the bolt. Most preferably, whether the bolt is general use or made of a high tensile material for uses demanding higher strength is visibly indicated.

Preferably, the improvement means includes one or more slots. Preferably, the one or more slots indicate the length of the shaft of the bolt. Preferably, the one or more slots may also be used as the adjustment means. Preferably, the visual indication means includes one or more slots. Preferably, the adjustment means includes one or more slots. Preferably, the one or more slots of the improvement means provide both a visual indication means of the characteristics of the bolt and also provides adjustment means for use with a tool to rotate or rotate back the bolt in the hole.

In a simple form of the invention long or short slots are used crossed to indicate the length of the bolt in a range being a visual indicator means and the use of tools enables rotation or anti-rotation of the bolt in the hole through use of the slots as adjustment means. Preferably, other information is visually conveyed through use of further visual indication means, in addition to the slots. These additional indication means may be chosen from the group: lines; dots; arrows; chevrons; circles; irregular shapes; rectangular including square; triangles; stars; and repeats or combinations of any of the foregoing. There may be inclusions of the improvement means associated with other parts of the bolt or forming other parts of the bolt not limited to the head.

Preferably, in a simple form the improvement means includes a system of slots, two short crossed indicating a shaft of less than 2 inches, a single long slot crossed by a short slot indicating a shaft of between 2 inches and 11 inches long, and a long single shaft indicating a shaft of greater than 11 inches, for example, 12 inches or longer. For each of these similar indications, these are visual indications as the length of the shaft. The slots are also able to be used by use of a tool such as a screwdriver, and wrench, to adjust the bolt forward or back, rotation or anti-rotation. In addition to the slots, for shaft lengths over 2 inches an arrow is included on the long slot at the 12 O'clock position to give orientation—more on this below. If more than one arrow is included this indicates multiples of 12, so two arrows means the shaft length is 24 inches or great and so on. In mining applications very large and long bolts may be of use. In addition to the slots which are both visual indicators and adjustment means dots or holes may be included. These dots or holes may be included for all shaft sizes greater than 2 inches. The dot or hole is added at the clock face position to indicate the length of shaft. At the west point as if a compass or the 9 O'clock position with a long slot with an arrow crossed by a short slot, this indicates a bolt with a shaft of 9 inches. If the short slot is omitted the dot in the same position indicates 12 plus 9 so 21 inches. If two arrows are included to show that the start point is 24 inches the same reading would be 24 plus 9, 33 inches and so on. The system is therefore readable in multiple ways, after only a very simple introduction. There is no need to own look up tables or calculate complicated codes, very quickly the bolt shaft length can easily be read from the head of the bolt on a quick look.

In another form of the invention, a long slot is used to indicate that the length of shaft is greater than 2 inches or the metric equivalent. In this form of the invention the crossing short slot indicates a half measure. These visual indicators may be used interchangeably. One or more dots may be used as part of the visual indication means to indicate the length of the shaft. For example, a second dot may be used to indicate that 12 inches of shaft is present and the first dot in this case indicates the further length. So 2 dots at 2 O'clock indicates 14 inches. Where a short cross slot is also included this may indicate an additional half inch in length. Variants may be made to the particular arrangement.

Preferably, the visual indication means includes means to identify features chosen from the group: length of shaft; material of bolt. Preferably, the improvement means includes one or more chosen from the group: slot, long slot, short slot, crossed slot, dot, multiple dots, arrows, chevrons or any other indication.

Preferably, a visual indication means includes, slots, marks, dots, arrows, chevrons or any suitable marks or shapes to indicate a feature of the bolt. Chevrons may be included to indicate if the bolt is general use, one pair or two or more pairs for high tensile or very strong bolts.

Preferably, the slots provide both visual and adjustment means. The slots and dots are a useful means to indicate the length of shaft. Other indicators could be used instead. Other characteristics such as material used, high tensile or ordinary can also be used, and indicated, including in addition to the length of shaft. Any number of characteristics may be indicated by one or more visual indicator. The particular arrangement of slots and dots or other symbols may be varied. Preferably, the visual indicators are added during manufacture so as to be integral to the bolt and not able to be added or altered after manufacture. Similarly, where these are slots and dots these are formed during manufacture to enable adjustment through the life of the bolt.

Preferably, the improvement means includes one or more symbol. These symbols may take any suitable form. However, most preferably, these are readily understood without the need to refer to tables or other information. Use of a clock arrangement would be instantly understandable by most people. Use of an increasing clock system for bolts with shafts of increasing length should be readily understood. The system may be used for any suitable length of shaft.

Preferably, the improvement means includes one or more adjustment means. The adjustment means may take any suitable form. Preferably, the adjustment enables accurate and aligned installation in the hole. Preferably, the adjustment enables rotation or anti-rotation of the bolt after to enable an improved installation. Preferably, adjusting the bolt within the hole tightens the installation. Preferably, the adjustment means may be used at the time of installation to improve the installation. Or the adjustment means may be used later to maintain the installation. Visual cues may be provided that the bolt needs rotating or anti-rotating through use of the adjustment means. These may be that the visual indicators are not in the expected alignment signalling that adjustment is required. The adjustment means therefore allows the bolt to be checked and adjusted years after installation, improving safety and avoiding the need to replace the bolts. The adjustment means may be used after the orientation of the visual indication means indicates that the bolt has moved from the orientation of the initial installation.

Preferably, the engagement means holds the bolt in the surface. Preferably, the engagement means on engagement in the hole flares out to fill the hole and prevent the bolt falling out. This may be a wedged flange or sleeve. Any of the known forms of engagement of anchor or expansion bolts may be used. As stated elsewhere, the bolt may also be threaded in a different form of the invention and in this case the threads on the shaft form part of the engagement means.

Preferably, the engagement enables strong installation in the surface. Preferably, the installation enables strong installation of bolts able to suspend objects of weight. The bolts may be used in rock climbing to support people or equipment.

The association between the engagement means and the shaft may take any suitable form. The association may be that a sleeve surrounds the shaft. The association means may be that the engagement means is attached or connected to the shaft. The association may be that the engagement means forms part of the shaft in some forms of the invention.

The surface may be any one or more surfaces where a bolt may be installed. There may be more than one surface. The surface may be a rock face. The surface may be a construction material. The surface may be any suitable surface or material where a bolt may be installed. Surface is to be interpreted broadly, as the location of bolt installation, surface being a convenient manner of referring to said location.

Preferably, the hole is drilled before installation of the bolt. The hole may be formed in any suitable manner. Or the hole may be formed as the bolt is installed. Preferably, the hole is precisely drilled for receipt of the bolt.

Preferably, the improvement means includes visual indicators as to one or more characteristic of the bolt. Preferably, the length of shaft of the bolt may be indicated by the visual indicator. Any suitable feature of the bolt may be indicated visual as part of the improvement means. Most preferably, the visual indicator may be read in the similar manner to a clock. Preferably, increased number on the clock face of a mark or symbol indicates a longer length of shaft. Preferably, a plurality of visual indicators are used. Preferably, the visual indicators together form an easy to read and understand indication of a characteristic of the bolt. Most preferably, the characteristic in this case is the length of the shaft of the bolt. Any type, kind or characteristic or other feature of the bolt may be indicated by the indication means.

An arrow may be used at the 12 O'clock to indicate this and orientation the visual recognition. More than one arrow may be included to indicate multiples of 12 in the length of shaft of the bolt. Any more than one symbol may be used for the invention as visual indicators. These symbols should be of necessary clarity to be readily understood by the user.

Accordingly, the present invention provides, in one aspect, an improved bolt apparatus for installation, the improved bolt apparatus including:
a bolt having a head, shaft and an end and the head of the bolt including a visual indicator;
an engagement means, associated with the shaft, between the head and the end of the bolt, for engaging with or into a surface where the bolt is to be installed,
wherein, the improved bolt apparatus may be installed into a suitable hole in the surface, and the visual indicator enables the type, kind or other characteristics of the bolt to be seen and readily understood.

Accordingly, the present invention provides, in another aspect, an improved bolt apparatus for installation, the improved bolt apparatus including:
a bolt having a head, shaft and end, and the head of the bolt including one or more adjustment means and one or more visual indicator;
an engagement means, associated with the shaft of the bolt, between the head and the end, for engaging with or into the surface,
wherein, the bolt may be installed into a suitable hole in the surface to secure the bolt in place, and the visual indicator enables the type, kind or other characteristics of the bolt to be seen, and the adjustment means enables rotation/antirotation of the bolt within the hole to adjust the bolt installation in the surface, in a beneficial manner.

Accordingly, the present invention provides, in a further aspect, an improved bolt apparatus for installation, the improved bolt apparatus including:
a bolt having a head, shaft and end, the head of the bolt including one or more adjustment means;
an engagement means, associated with the shaft of the bolt, between the head and the end, for engaging with or into a surface,
wherein, the improved bolt apparatus may be installed into a suitable hole in the surface to secure the improved bolt apparatus in place, and the adjustment means enables rotation of the bolt within the hole to adjust the bolt installation in the surface in a beneficial manner.

Preferably, the adjustment means includes a recess for receipt of a tool to enable rotation. Preferably, the adjustment means includes one or more slot for receipt of a screwdriver.

Accordingly, the present invention provides, in a further variant, an improved anchor bolt for installation into a surface, the improved anchor bolt including:
a bolt having a head, shaft and end, the head of the bolt including at least one slot for receipt of a screwdriver to enable rotation and or anti-rotation and a readily recognisable visual indicator as to the length of the shaft and or other characteristics of the bolt, including at least one slot as part of this visual indication;
an engagement means, associated with the shaft of the bolt, between the head and the end, for engaging with the surface in which the bolt is installed to anchor the bolt in the surface,
wherein, the anchor bolt may be installed into a suitable hole in the surface to secure the bolt in place, and the rotation/anti-rotation means enables rotation/anti-rotation of the bolt within the hole to adjust the bolt installation in the surface in a beneficial manner, and the visual indicator enables the type, kind or characteristics of the bolt to be seen in a very easily recognisable manner.

Accordingly, the invention also provides a method of use of an improved bolt, the improved bolt having a head, shaft and an end, and the head of the bolt including improvement means, and an engagement means including a visual indication means and an adjustment means, associated with the shaft, between the head and the end of the bolt, for engaging into the surface, the method including the following steps:— a) forming a hole in the surface for receipt of the end and shaft of the bolt
b) positioning the bolt in the hole;
c) rotating the bolt in the hole to cause engagement of the engagement means with the sides of the hole.

Preferably, the improvement means include adjustment means and adjustment to the bolt may occur after installation to improve the installation. The adjustment may be rotation or anti-rotation.

Accordingly, the invention also provides a method of use of an improved bolt, the improved bolt having a head, shaft and an end, and the head of the bolt including at least one adjustment means, and an engagement means, associated with the shaft, between the head and the end of the bolt, for engaging into the surface, the method including the following steps:—
a) forming a hole in the surface for receipt of the end and shaft of the bolt
b) positioning the bolt in the hole;
c) rotating the bolt in the hole to cause engagement of the engagement means with the sides of the hole;
d) if necessary adjustment may occur through rotation or anti-rotation of the head of the bolt through use of a suitable tool in the adjustment means, whereby the installation can be adjusted to be a good fit.

Step a) the forming of the hole may be made before use of the method, as part of the method, or the hole may be formed by driving the bolt into the surface that is not as an extra step. Preferably, the adjustment means is one or more slot and the tool is a suitable screwdriver.

Accordingly, the invention provides a further method of use of an improved bolt, the improved bolt having a head, shaft and an end, and the head of the bolt including readily recognisable visual indicator, and an engagement means, associated with the shaft, between the head and the end of the bolt, for engaging into the surface, the method including the following steps:
a) installing the bolt in the surface;
b) inspecting the bolt head and observing the visual indicator;
c) discerning one or more characteristic of the installed bolt from the visual indicator.

Preferably, the visual indicator indicates the length of shaft of the bolt. The visual indicator may indicate any suitable characteristic of the bolt. These may include length of shaft, material of bolt, strength, kind, any suitable feature may be in indicated through use of the visual indicator. Most preferably, an arrangement of one or more slots indicates the characteristics of the bolt. Preferably, an arrangement of one or slots may also be used to adjust the installed bolt through use of a tool. Most preferably, the visual indicator and adjustment means are combined or are the same so as be used both to indicate information and also to enable adjustment. For example, a pair of crossed slots may be used indicating particular length of bolt shaft and these crossed slots can also be used with a screwdriver to rotation or anti-rotate the bolt to adjust the installation.

Preferably, the improved bolt of the methods is the improved bolt of the invention in any of its forms or variants.

INDUSTRIAL APPLICABILITY

The improved bolts can be manufactured industrially, and supplied to retailers, wholesalers, or direct to the user.

BRIEF DESCRIPTION OF THE DRAWINGS

The invention will now be described in connection with non-limiting preferred embodiments with reference to the accompanying drawings, in which:

FIG. 2 is a plan view from above of the second preferred embodiments of the head of the bolt of the invention, with a different head format indicating visually different characteristics of the bolt;

FIG. 3 is a plan view from above of the third preferred embodiments of the head of the bolt of the invention, with a different head format indicating visually different characteristics of the bolt;

FIG. 4 is a plan view from above of the fourth preferred embodiments of the head of the bolt of the invention, with a different head format indicating visually different characteristics of the bolt;

FIG. 5 is a plan view from above of the fifth preferred embodiments of the head of the bolt of the invention, with a different head format indicating visually different characteristics of the bolt;

FIG. 6 is a plan view from above of the sixth preferred embodiments of the head of the bolt of the invention, with a different head format indicating visually different characteristics of the bolt;

FIG. 7 is a plan view from above of the seven preferred embodiments of the head of the bolt of the invention, with a different head format indicating visually different characteristics of the bolt;

FIG. 8 is a plan view from above of the eighth preferred embodiments of the head of the bolt of the invention, with a different head format indicating visually different characteristics of the bolt;

FIG. 9 is a plan views from above of the ninth preferred embodiments of the head of the bolt of the invention, with a different head format indicating visually different characteristics of the bolt;

FIG. 15 is a plan view from above of the eleventh preferred embodiments of the head of the bolt of the invention, with a different head format indicating visually different characteristics of the bolt;

FIG. 16 is a plan view from above of the twelfth preferred embodiments of the head of the bolt of the invention, with a different head format indicating visually different characteristics of the bolt;

FIG. 17 is a plan view from above of the thirteenth preferred embodiments of the head of the bolt of the invention, with a different head format indicating visually different characteristics of the bolt;

FIG. 18 is a plan view from above of the fourteenth preferred embodiments of the head of the bolt of the invention, with a different head format indicating visually different characteristics of the bolt; and FIG. 19 is a plan view from above of the fifteenth preferred embodiments of the head of the bolt of the invention, with a different head format indicating visually different characteristics of the bolt.

DETAILED DESCRIPTION OF THE INVENTION INCLUDING A BEST MODE

Figure 1:
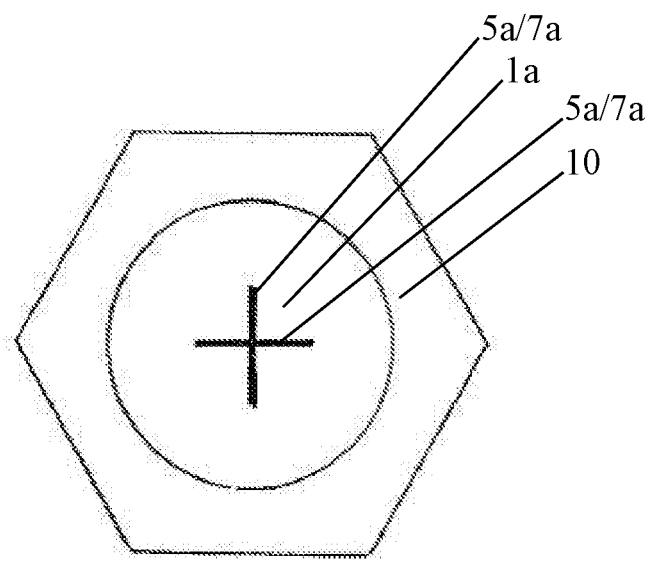
FIG. 1 to FIG. 9 are plan views from above of the first, second, third, fourth, fifth, sixth, seventh, eighth and ninth preferred embodiments of the head of the bolt of the invention, differing only in the head format indicating visually different characteristics of the bolt, the bolt itself having one of two embodiments as described in FIG. 10 or 13 below.
Figure 2:
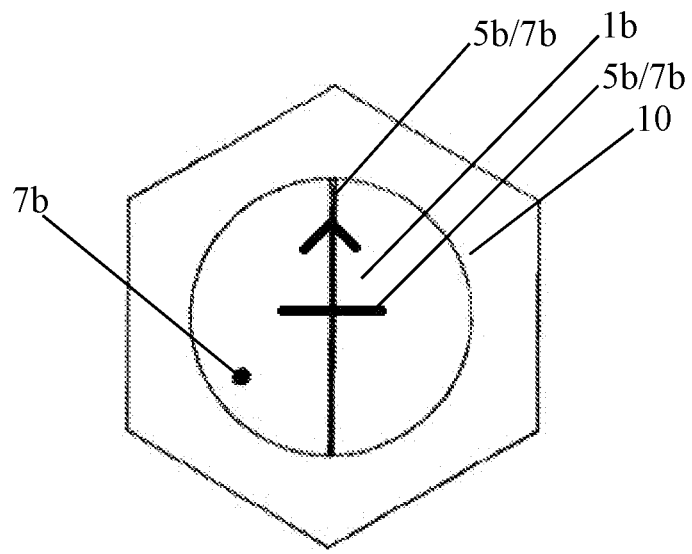
Figure 3:
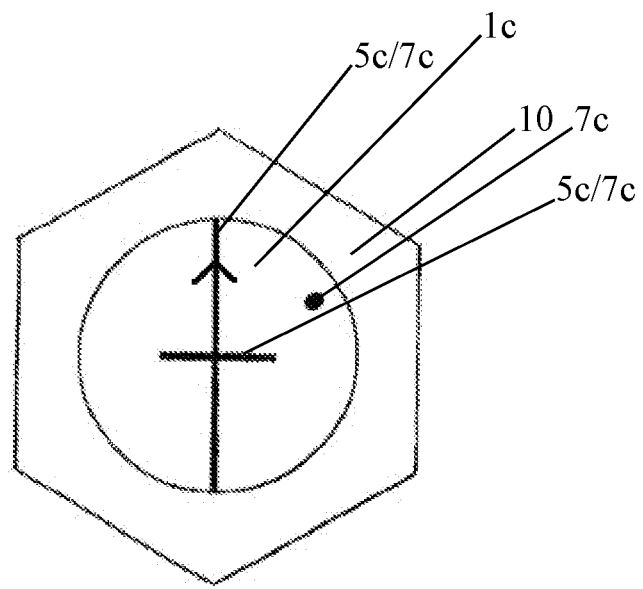
Figure 4:
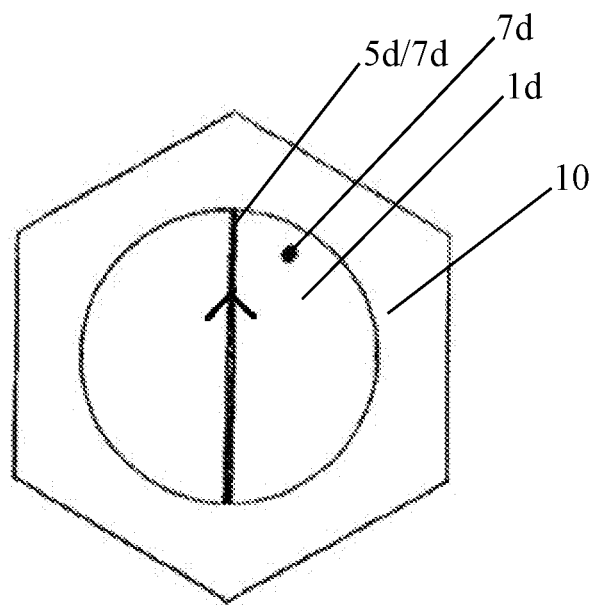
Figure 5:
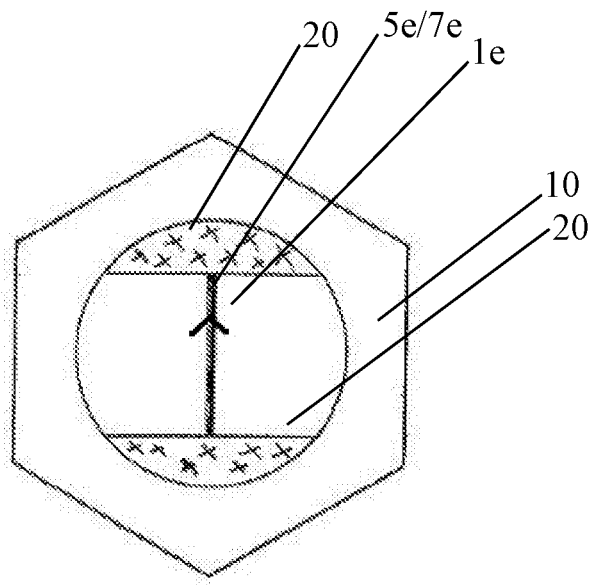
Figure 6:
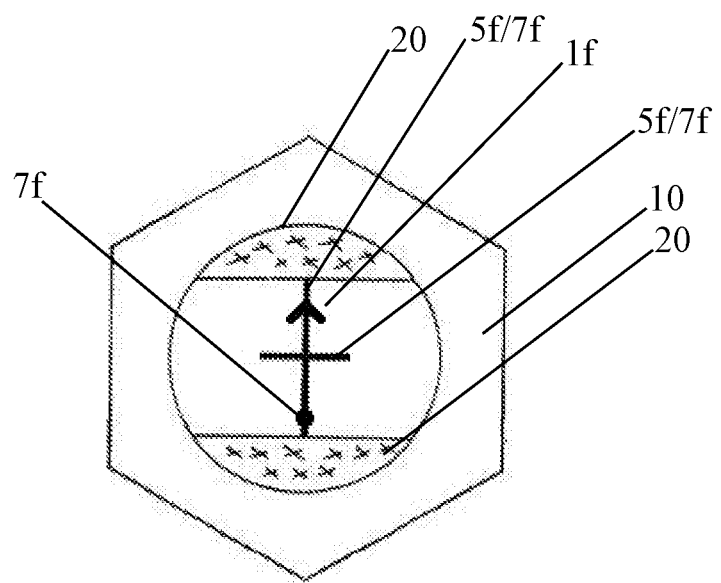
Figure 7:
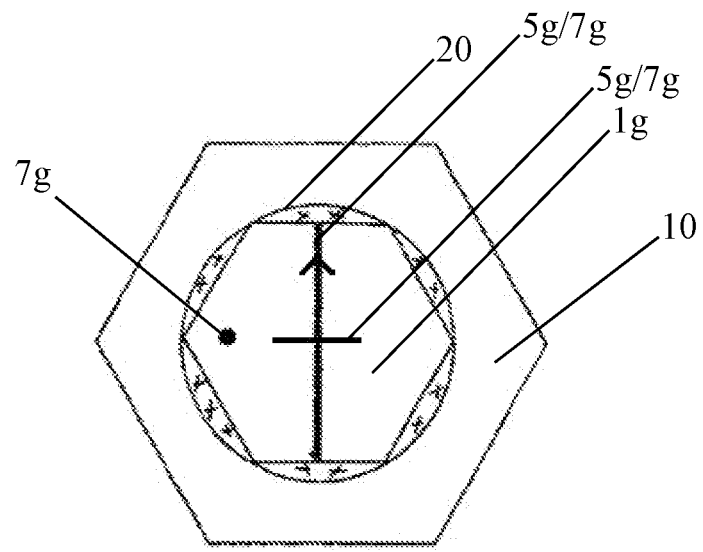
Figure 8:
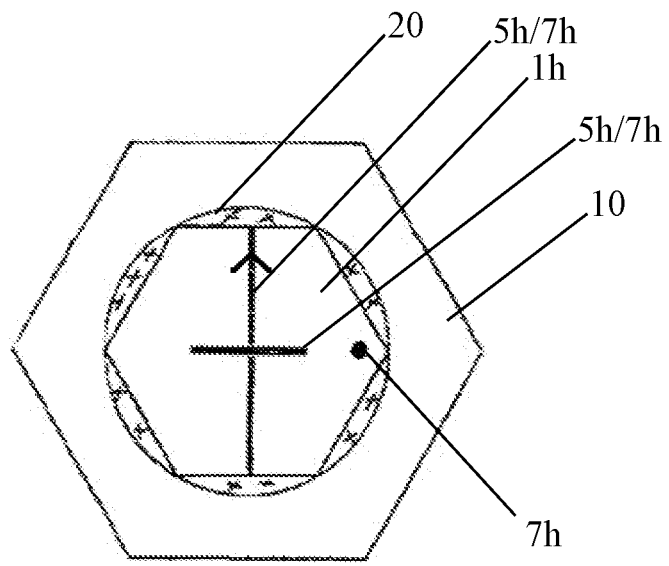
Figure 9:
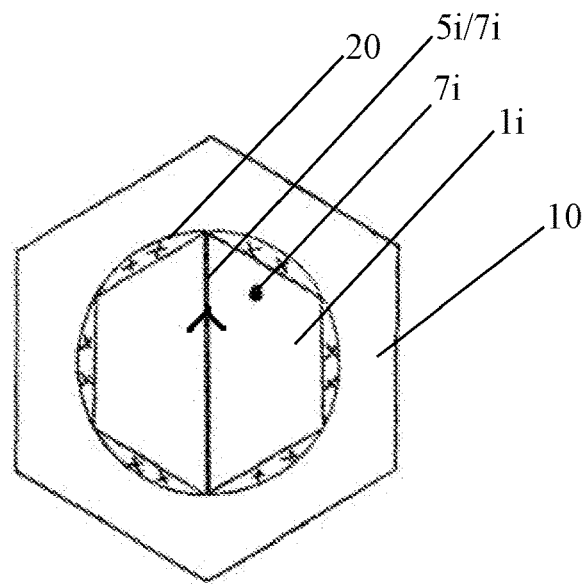
Figure 10:
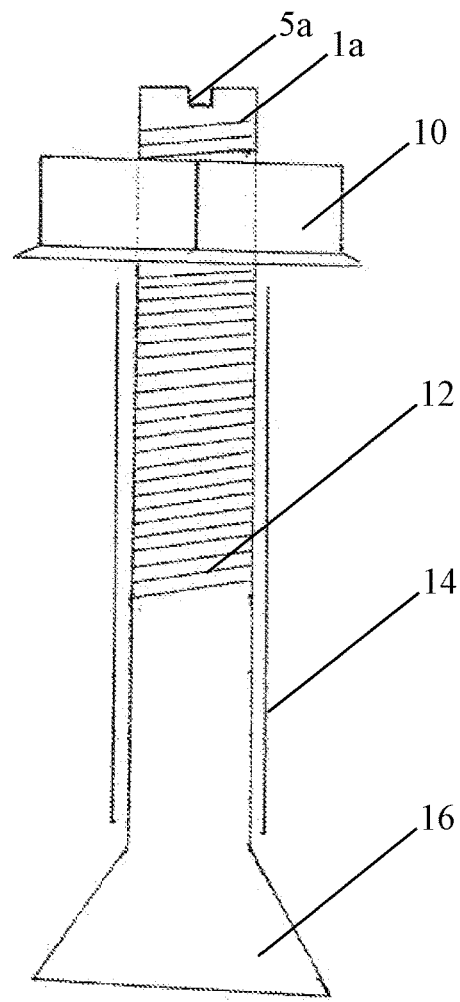
FIG. 10 is a schematic cross-sectional view of the first embodiment of bolt having the head of FIG. 1, illustrating the shaft, flared end (wedge post) and sleeve.
Figure 12:
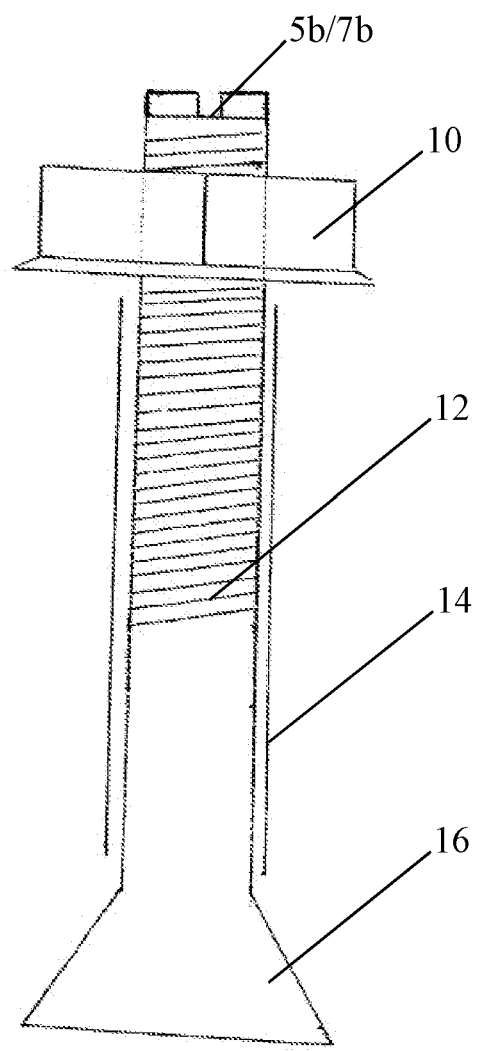
FIG. 12 is a schematic cross-sectional view of the second embodiment head of FIG. 2 with the first embodiment bolt, shaft, wedge post and sleeve of FIGS. 10 and 11.
Figure 13:
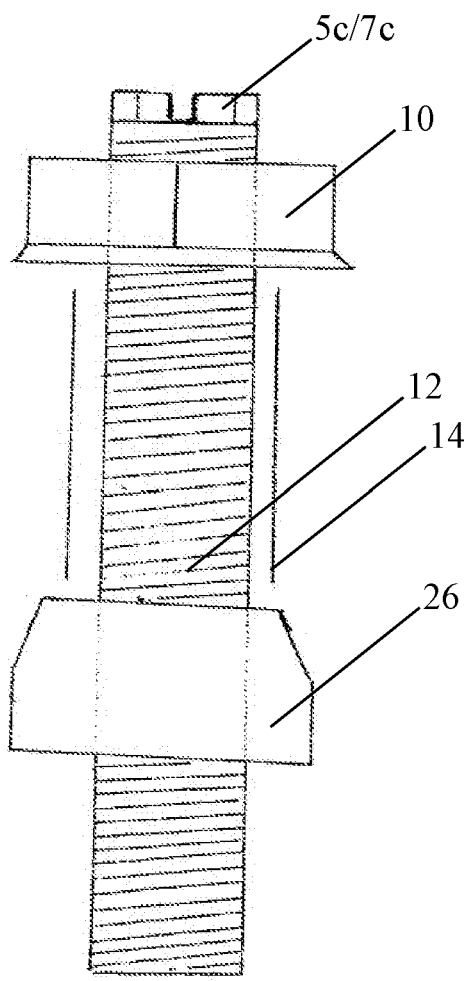
FIG. 13 illustrates the third embodiment bolt head of FIG. 3, with a second embodiment form of bolt, sleeve and second nut.
Figure 14:
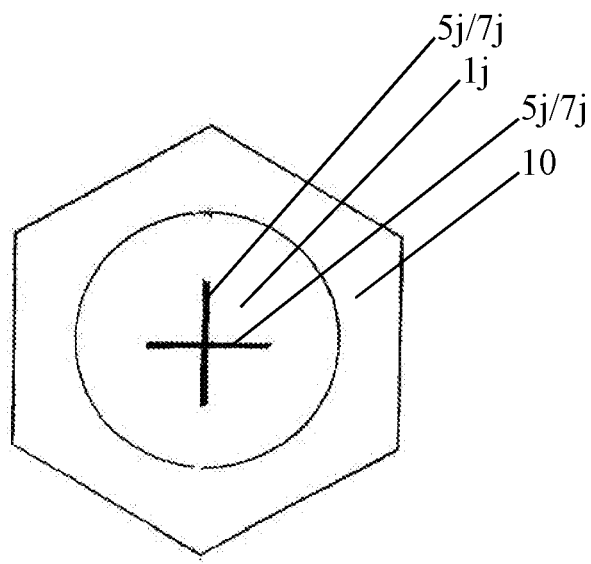
FIG. 14 to FIG. 19 are plan views from above of the tenth, eleventh, twelfth, thirteenth, fourteenth, and fifteenth preferred embodiments of the head of the bolt of the invention, again differing only in the head format indicating visually different characteristics of the bolt using a different indication method, the bolt, shaft, wedge post and sleeve being that of the first embodiment.
Figure 15:
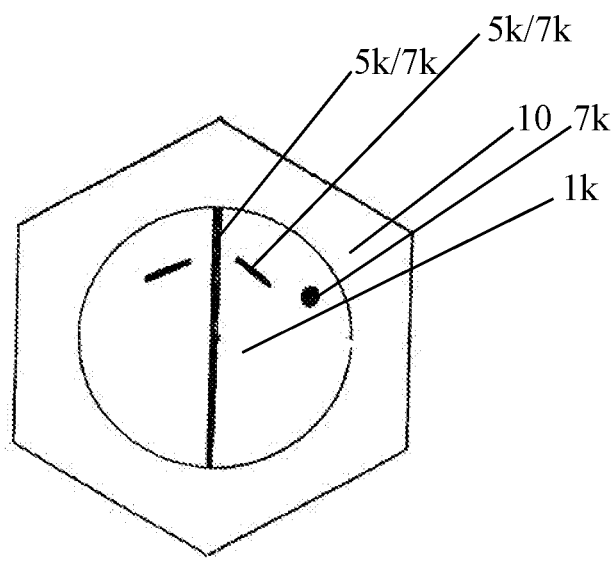

Referring to FIGS. 1 to 13, where various heads are shown 1a-1i being preferred embodiments first through ninth, used with two preferred forms of bolt, shaft and sleeve (refer FIG. 10 embodiment one of the bolt and shaft and separately FIG. 13 for the second embodiment of the bolt and shaft). Each form of head has rotation/anti-rotation means 5a-5i as indicated in each drawing and described in further detail below. The rotation or anti-rotation means enables adjustment in one, or both directions to adjust the orientation of bolts 1a-1i during installation or later for maintenance. It is extremely useful to be able to rotate the bolt back in the case of over rotation, to adjust the bolt installation.

Any suitable means of turning the bolt may be used. It is particularly useful in the subject invention that a conventional screwdriver may be used to turn the bolt within the apparatus, by holding the nut and rotating the bolt clockwise or anticlockwise as suitable to tighten up or loosen off the installation. Any suitable tool may be used and the rotation/anti-rotation device may therefore be convention to correspond to a conventional tool use or may be adapted to be particular to bolt, requiring a specialist tool. Use of conventional tools may be used in frequently used bolts for ease. Specialist application bolts may be protected from tampering or unauthorised use by the requirement for a specialist tool to rotate or rotate back.

Each form of bolt head 1a-1i also includes visual indicator means 7a-7i. Notably these visual indicator means may be the same or different to the rotation/anti-rotation means 5a-5i, as will become apparent with the specific descriptions below. In the most part these visual indicator means 7a-7i are slots, arrows and or dots added during manufacture which cannot be tampered with and will continue to indicate the nature of the bolt and length of shaft even after installation. The visual indicators, could, in other forms of the invention, be added or take other forms, other than slots and dots formed in the material.

For example, paint or other coloured indicators could be included either on their own or preferably in addition to the formed slots and dots to further assist to distinguish the bolts of the invention, and their type or kind. Other shapes and symbols could be used but it is most useful to use the clock face based system of the inventor as it is very easy to understand and recognise without the need to learn a system or refer to tables or charts.

The first form of anchor bolt of FIG. 10 has nut 10, shaft 12, sleeve 14 and wedge 16, and is of a known form made of a strong metal. Some of the drawings are somewhat schematic, as would be readily understood by the person skilled in the art. It is the head of the bolt in particular that is new and inventive, allowing the rotation back but also including the visual indication. The particular form of the bolt and attachment into a surface may be any form.

Figure 11:
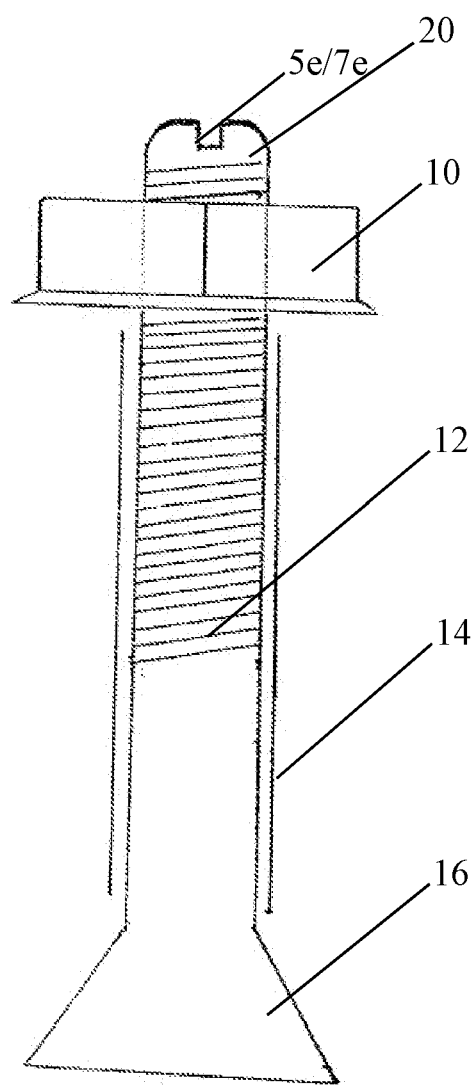
FIG. 11 is a schematic cross-sectional view of the fifth embodiment head of FIG. 5 with curved edges, with first embodiment bolt, shaft, wedge post and sleeve of FIG. 10.

Referring to FIG. 13, the second form of anchor bolt, is shown, similar to the first but has no wedge at the base, including instead wedge nut 26. The particular forms of anchor bolt or expansion bolt may again be varied to incorporate the novel and inventive features of the subject invention, these are merely two useful illustrative examples. The bolt form for any of the described heads may be used with any suitable bolt includes those described in FIGS. 10 and 13. The bolt itself may be general purpose or high tensile bolts depending on the particular application. As illustrated FIGS. 10 and 11 show general purpose bolts, and FIGS. 12 and 13 show high tensile bolts, including with cut-out sides. These materials and forms of bolt may be interchanged. FIGS. 5 to 9 also show the high tensile bolt heads, with rounded edges to prevent corrosion. These rounded edges could also be replaced, but are useful in the high tensile, rock forming use of the invention, as would be understood by the person skilled in the art of rock forming bolt installations.

The materials used throughout are metal and this can be varied depending on the type, kind or characteristic of the bolt. For example, strong steel may be used, or titanium or other specialised metals for specialist applications. Galvanisation or zinc coating may be applied as required. The material or coating or combination of materials or coatings may be varied to suit the particular application.

Use of high tensile materials is particularly desirable in some applications. Use of strong or very strong metals can be very useful for these kinds of bolts, and the material can clearly be varied. The use of the invention is a significant improvement as these high quality, high strength bolts can be identified, even long after installation. The cost of these quality bolts can be further justified when it is clear during the life of the installation that the bolts installed are of this high quality and strength. At present once the bolt is installed there is simply no way to know the quality and strength of the bolt without removal of the bolt and testing.

Domed heads may be used for some applications where there may be contact, for example, for safety. Or where it is desirable to resist corrosion. Domed heads may be used in any of the forms or embodiments, as would be understood by a person skilled in the art.

The method of use is the same as for a conventional anchor bolt or expansion bolt, up to a point. The method is to drill a hole of a suitable size into which the bolt is placed, perhaps hammered in and then a wrench used to tighten the bolt and hence the deformable collar. For the first form of bolt wedge 16 forces collar 14 out to engage with the surrounding rock or concrete and hold fast. In the second form wedge nut 26 does the same thing, both turned into the surface to create friction and hold within the surface. Once turned in, the standard known bolts cannot be rotated or anti-rotated, they are fixed in place. In the subject invention the situation is very different, due to one or more slot provided in the heads of the bolts, which enables adjustment during installation or even much later. Rotation or anti-rotation may occur to enable slight adjustment to the position of the bolt within the surface to make sure the installation is strong and secure. The rotation or anti-rotation of the bolt, however does not damage the hole or cause damage or loosening, the bolt remains with the originally drilled hole. In this manner careful adjustment may be made to beneficially improve the installation. Or later, should adjustment be required this can be readily discerned by looking at the orientation of the markings on the head and adjusted back to where it is held strongly in place.

As described the form of the arrangement of bolt heads is designed like a traditional clock face so that a viewer can instantly discern the nature of comparative bolt heads. As an overview, two crossed short slots indicates a shaft of less than 2 inches, one long and one short slot indicates 2 to 11 inches with an arrow included to give the location of the 12 O'clock position. The 12 O'clock position is then used to orientate any dots. These dots are formed at the number points around the clock face. So using the arrow on the long slot to find 12, then if there is a dot at the 9 O'clock position this indicates a 9 inch shaft. Where the short cross slot is omitted this indicates that the shaft is 12 inches or greater. In this case the 1 position will mean 12 inches plus 1 is 13 inches. The system could continue, if two arrows are included the 12 position becomes 24 inches and so the 1 position is 25 inches and so on.

Each of the heads to the bolt indicate a different type of bolt which can readily be seen by looking, even when installed. As illustrated these can be summarised as follows:—

Head 1a (FIG. 1) the first bolt head embodiment illustrates a general purpose bolt of less than 2 inches, 50.8 millimetres shaft length through use of the short cross-slots 5a/7a. Rotation/anti-rotation means 5a of head 1a, happens to also be the visual indicators 7a for this particular form of head. The visual indication of 7a is that there is a short crossed slot arrangement similar to a PHILIPS (Trade Mark) head screwdriver, indicating a short shaft bolt. The rotation/anti-rotation means and visual indicators through-out can be one or more feature, with each feature being able to be read or used separately, or together. For example, in the first example, head 1a, of FIG. 1 has rotation/anti-rotation means 5a/7a which both enable rotation or anti-rotation to adjust the bolt but also to show visually that the bolt has a short shaft.

Head 1b (FIG. 2) the second bolt head embodiment illustrates a further general purpose bolt head, of greater than 6 inches, 203.2 millimetres, in this case 8 inch shaft length. The length of shaft is quickly seen to be 2 to 11 inches through use of the long slot crossed with the short slot. The arrow indicates the 12 position so that an indentation added during manufacture at the 8 O'clock position, can be read to indicate that the shaft length is specifically an 8 inch, 203.2 millimetres bolt. Clearly, a quick look at head 1a instantly tells you, long slot and short slot, 2 to 11 inch shaft, and the dot, 8 inch-easy! In head 1b rotation/anti-rotation means 5b is the long slot with arrow and crossing short slot is all part of visual indicator 7b. Dot or indentation 7b is also part of the visual indication but does not act to turn the bolt. Clearly, visual indicator 7b could include other parts too, but the system developed carefully by the inventor is such that the visual information is instantly easily understandable.

Head 1c (FIG. 3) the third bolt head embodiment illustrates a general purpose bolt of 2 inches, 50.8 millimetres shaft length through use of the cross-slots 5c/7c. Rotation/anti-rotation means 5c of head 1c, is also part of the visual indicators 7c with dot 7c for this particular form of head. The visual indication of 7c is that there is a short crossed slot over the long slot with arrow for orientation, indicating a shorter 2 to 11 inch shaft. The dot at 2 O'clock gives the specific 2 inch shaft length. Both a cross-head screwdriver, and a plain screwdriver could be used in these slots, as the rotation/anti-rotation means 5c for adjustment of the bolt. So visually 7c the long and short crossed slots to say 2 to 11 inches and includes the dot to say 2 O'clock, 2 inch 50.8 millimetres shaft.

Head 1d (FIG. 4) the fourth bolt head embodiment illustrates another general purpose bolt of 13 inches, 330.20 millimetres shaft length. The short cross 5d/7d slot is omitted to show that the shaft length is 12 inches or more in length. The long slot 5d/7d is included with the arrow to orientate the 12 o'clock position. Rotation/anti-rotation means 5d of head 1d, is also part of the visual indicators 7d with dot 7d for this particular form of head at the 13 hours under the 24 clock position (1 O'clock under the 12 hour clock) to indicate that the bolt has a shaft of 13 inches, 330.20 millimetres. The visual indication of 7d includes slots, for use with a plain screwdriver, as the rotation/anti-rotation means 5d for adjustment of the bolt. Visually use of both the long slot and arrowhead indicates that the bolt has a shaft greater than 12 inches 304.80 millimetres, and the 7d dot finishes with the specific information of 12 plus 1 a 13 inches, 330.20 millimetres shaft.

Head 1e (FIG. 5) the fifth bolt head embodiment illustrates a high tensile bolt, rather than general purpose, of 12 inches 304.80 millimetres shaft length. A dot could be included at the 12 O'clock position for 12 inches but is omitted from FIG. 5. The shaft length is indicated by the single long slot 5e/7e at the 12 O'clock position, with the arrow for orientation. Visual indicator 7e, the long slot, indicates 12 inches. No short cross slot is included which would indicate a shaft of shorter than 11 inches. No dot is included to indicate a greater than 12 inch shaft. Bolt head 1e includes cut-outs 20 on either side to round the edges and prevent corrosion. These are beneficial but may be omitted. Rotation/anti-rotation means 5e can be used with a standard flat screwdriver to adjust bolt 1e back or forth.

Head 1f (FIG. 6) the sixth bolt head embodiment illustrates a high tensile bolt, of 6 inches 152.40 millimetres shaft length. Cut-outs 20 are again included to round the edges. The shaft length is indicated by the long slot 5f/7f at the vertical with a short cross slot 5f/7f to indicate 2 to 11 inch shaft. Again the function of the arrangement of a long and a short slot is to indicate a less than 12 inches shaft length, with the dot at the 6 position to indicate 6 inches specifically. It is possible that the shaft indication indicates a range of lengths or a minimum length rather than a specific length in some forms of the invention. As a visual indicator 7f is formed of the slots, arrow and dots together. Rotation/anti-rotation means 5f makes use of a screwdriver rotation of bolt 1f in the long and or short slots of 5f/7f.

Head 1g (FIG. 7) the seventh bolt head embodiment illustrates a high tensile bolt, of 9 inches 228.60 millimetres. Cut-outs 20 are again included to round the edges, to form a hexagon shape. The hexagon shape could form part of the visual indicator 7g. The shaft length is again indicated by the long slot 5g/7g with arrow at the 12 O'clock position, crossed by a short slot to show less than 12 inches, with dot 7g at the 9 O'clock point to indicate 9 inches 228.60 millimetres. A flat screwdriver may be used with 5g the slot to adjust the bolt. It is clear from a quick look at the bolt that the shaft is 9 inches 228.60 millimetres.

Head 1h (FIG. 8) the eighth bolt head embodiment illustrates a high tensile bolt, of 3 inches 76.20 millimetres. Cut-outs 20 are again included to round the edges, to form a hexagon shape. Again the hexagon shape could form part of the visual indicator 7h. The shaft length is again indicated by the long slot 5h/7h running vertically but with a short slot crossing to indicate a less than 12 inch shaft. An arrow on the long slot is again included for orientation. A screwdriver may be used with 5h slots to adjust the bolt. The slots indicate the length of shaft for this type of bolt being a short shaft with dot 7*h* at the 3 O'clock position to indicate a shaft of 3 inches 76.20 millimetres.

Head 1*i* (FIG. 9) the ninth and final illustrated bolt head embodiment in this set illustrates a high tensile bolt, of 13 inches 330.20 millimetres. Cut-outs 20 are again included to round the edges, to form a hexagon shape. Again the hexagon shape could form part of the visual indicator 7*h*. The shaft length is indicated as long by only inclusion of long slot with arrow at the 12 O'clock position 5*i*/7*i* running vertically and dot 7*i* at the 13 position under a 24 hour clock indicates the length of the shaft. No short cross slot is included, indicating a shaft length of 12 inches or greater. The dot at the 1 position therefore can be thought of as 12 plus 1, equaling 13. Should 2 arrows be included on the long slot that would indicate the start point to be 24 inches, plus 1 would be 25 inches. Any number of arrows may be added accordingly and the person would still easily be able to interpret the length of shaft of the bolt. A screwdriver may be used with slot 5*i* to adjust the bolt to perfect the fit or adjust after installation by anti-rotation, for example.

Clearly, the particular head design may be simple or complex to convey more or less information as appropriate. However, it is an important benefit of the invention that no additional training or equipment is required to determine the characteristics of the bolt, due to use of the very simple to understand "clock" system, with which everyone is already familiar. The clock face and increase denoted by increasing numbers of the clock means that a person looking at a bolt will instantly and instinctively understand the relative characteristic of the bolt.

In some forms of the invention, as described further below the nature of the bolt and the suitable use can be determined by a quick look at the head. This may be for general purpose bolts, high tensile bolts or specialised bolts used in rock climbing, for example. The bolt arrangements of FIGS. 12 and 13 both are illustrated as high tensile bolt designs for specialised uses. The bolt arrangements of FIGS. 10 and 11, comparatively are for general purpose uses, that of FIG. 11 being a rock climbing application. The rock climbing bolts may include a domed head for safety and to act against corrosion as water does not lie on the surface. The arrangement of general purpose, high tensile, domed and flat topped bolts may be exchanged and varied to suit the particular application.

Referring in particular to FIGS. 14 to 19 another set of heads used for the invention are included, using a variant form of visual indication. Using similar reference numerals to the first set, heads 1*j*-1*o* include rotation/anti-rotation means 5*j*-5*o* and visual indicators means 7*j*-7*o* respectively. The use and description is the same as described for the first sets of heads, with the rotation/anti-rotation means being used to tighten or loosen off the heads during installation or later to adjust. The visual indicator means enables the user to readily determine the type or kind of bolt used, even long after installation. In more detail, the heads and characteristics are as follows.

Head 1*j* (FIG. 14) the tenth bolt head embodiment, first of the second set, illustrates a general purpose bolt of less than 2 inches, 50.8 millimetres shaft length through use of the short cross-slots 5*a*/7*a*. Rotation/anti-rotation means 5*j* of head 1*j*, is the visual indicator means 7*j* for this particular form of head. The visual indication of 7*a* is that there is a short crossed slot arrangement similar to a PHILIPS (Trade Mark) head screwdriver, indicating a short shaft bolt.

Head 1*k* (FIG. 15) the eleventh bolt head embodiment, second of the second set, illustrates a further general purpose bolt head, of 2 inches, 50.8 millimetres shaft length. In this form the long slot, rotation/anti-rotation means 5*k* (as well as part of visual indicator means 7*k*) indicates less than 6 inches and the number of inches is indicated by the clock face position of the dot part of the visual indicator means 7*k*, in this case at 2 O'clock. Rotation/anti-rotation means 5*k* is also the means by which the bolt head can be adjust to tighten or loosen, rotate or rotate back within the hole. The two side chevrons indicate the tensile strength of the bolt and also form part of the visual indication means 7*k*. One pair of chevrons indicates standard tensile strength, two sets, refer FIG. 19 for example, high tensile strength and so on.

Head 1*l* (FIG. 16) the twelfth bolt head embodiment, third of the second set, illustrates a general purpose bolt of 14 inches, 355.6 millimetres shaft length through use of the long slot 5*l* which is also part of visual indicator 7*l*. We can see that there is a single set of chevrons indicting standard strength, a general purpose bolt rather than high tensile. Rotation/anti-rotation means 5*l* of head 1*l*, is also part of the visual indicators 7*l* with two dots 7*l* for this particular form of head. The visual indication of 7*l* is that there is a long slot indicating a shaft greater than 2 inches. The two dots at 2 O'clock gives the specific 12 plus 2, 14 inch shaft length. If only one dot were present this would indicate 2 inches but two dots means that 12 inches are indicated plus the second dot, the second figure, totaling 14 inches in all.

Figure 16:
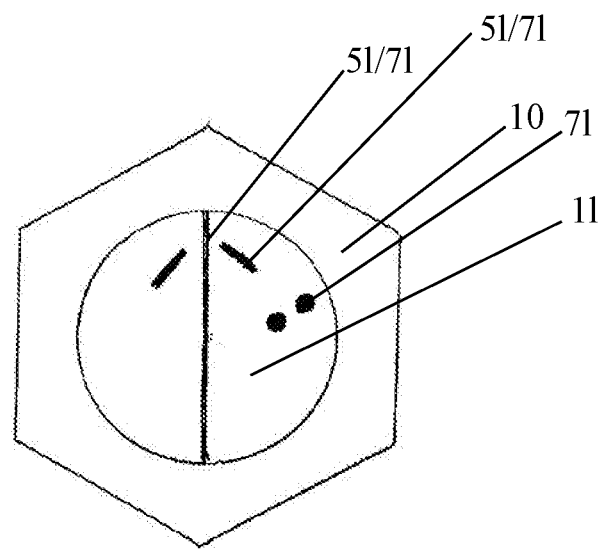
Figure 17:
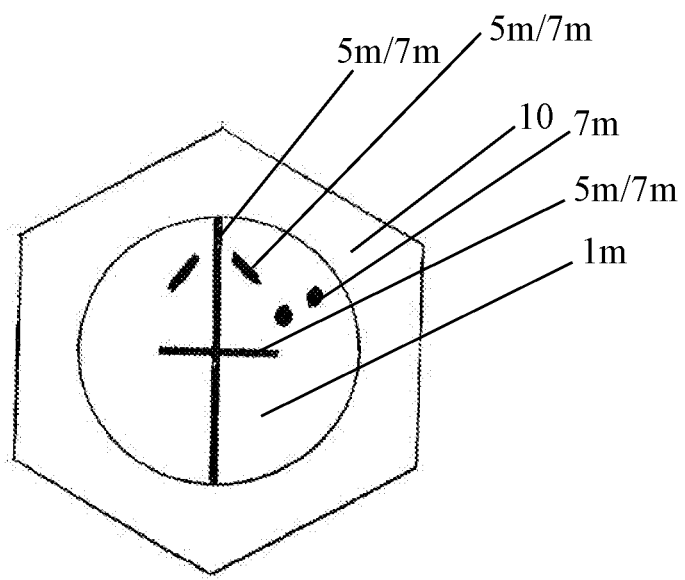

Head 1*m* (FIG. 17) the thirteenth bolt head embodiment, fourth of the second set, illustrates a general purpose bolt exactly the same as FIG. 16, except that the length is increased by a half inch as indicated by the short cross slot of 5*m* which also forms part of the visual indicator 7*m*. Head 1*m* clearly indicates 14 and a half inches, 368.3 millimetres shaft length through use of the cross-slots 5*m*/7*m* compared to the single long slot of FIG. 16. The dot arrangement to show 12 plus 2 inches and the single pair of chevrons are the same as for 14 inches as illustrated in FIG. 16.

Figure 18:
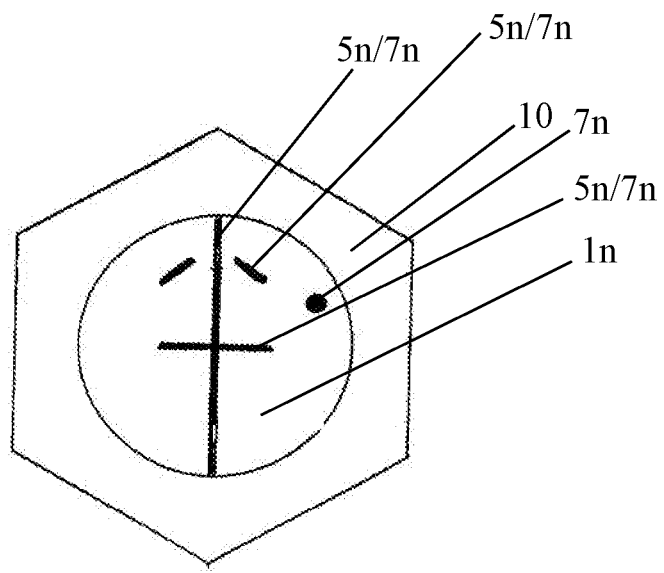
Figure 19:
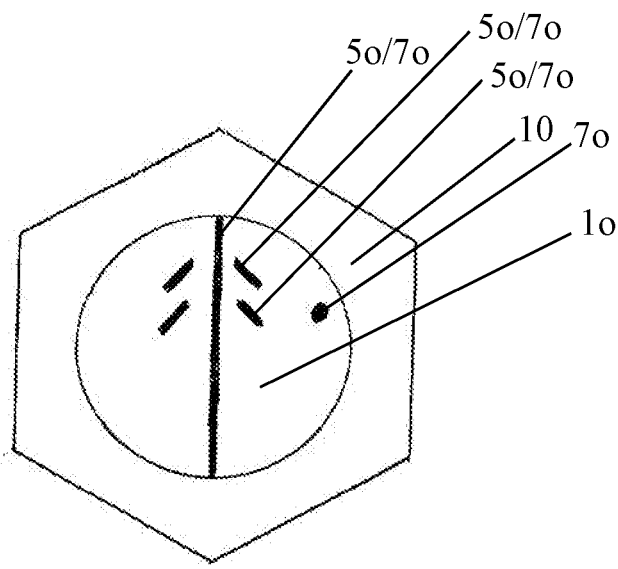

Head 1*n* (FIG. 18) the fourteenth bolt head embodiment, fifth of the second set, illustrates a general purpose bolt, of 2 and a half inches, 63.5 millimetres shaft length. The bolt of FIG. 18 is very similar to that of FIG. 15 in all things excepting that it is half an inch longer in shaft and that this is indicated but the second slot, a short cross slot part of 5*n* and 7*n* to rotate and visually indicate that the half inch is included in the shaft length.

Head 1*o* (FIG. 19) the fifteenth bolt head embodiment sixth of the second set, illustrates a high tensile bolt, of 2 inches, 50.8 millimetres shaft length. In this form, there are two sets of chevrons, part of the visual indicator means 7*o*, to indicate that the material of the bolt is a high tensile metal. The long slot, rotation/anti-rotation means 5*o* (as well as being part of visual indicator means 7*k*) indicates more than 2 inches and the number of inches is indicated by the clock face position of the dot part of the visual indicator means 7*o*, in this case at 2 O'clock.

As can be seen, in the second set of heads, a very simple to understand but sophisticated system is used to indicate strength, high tensile bolts having two pairs of chevrons or more, and the length of the shaft using the clock system and more than one dot if over 12 inches, a half inch indicated by a short cross slot. The clever systems of either sets of heads is a significant improvement over the art, as a suitable means to rotate the head, adjust back at installation or later, and to visually indicate through the life of the bolt the strength and shaft length.

Variation in the information communicated is clearly perceived within the invention and made to suit the needs of the user or the particular requirements of a jurisdiction. However, one of the factors that distinguishes the invention is that no charts or look up tables are required to determine the nature of the bolt, this can be readily seen straight-away simply by looking. A very short introduction to use of the bolts and the differences of the more involved visual indicators enables the user to very easily see the nature of the bolt and either choose a suitable one to install or verify that the installed bolt is safe and suitable for the purpose.

The bolt in any of its forms, once installed, can readily be recognised for the type of bolt due to the clever visual cues. Therefore it is readily apparent the type of bolt installed, just by looking. Use of a wrench to hold the nut enables engagement with the one or more slots so that the shaft can be rotated. In this way the positioning of the shaft can be adjusted for a better finish. More importantly, the rotation can be used to further tighten the shaft, to rotate for a stronger hold. Use of this adjustment enables poorly fitted anchor bolts to be adjusted to be strong, even where the hole has been badly drilled, a distinct advantage.

Throughout inch measurements under the imperial system converted to millimetres have been used to illustrate. The metric system works equally well and a particular system will be instantly recognisable and discernible during installation and use, without the need for further explanation.

Once the installation has been made, say in a rock face for rock climbing, at any later time observation of the head of the bolt will clearly indicate the size and potentially the loading capacity. Should the purpose of a particular loading point change it can be checked that the anchor bolt is still safe to use with this new purpose. If a change or adjustment is needed then this too can occur.

Overall the inventor has developed a very clever multi-purpose invention that is likely to be very well received once known about and lead to significant safety improvements.

It will be apparent to a person skilled in the art that changes may be made to the embodiments disclosed herein without departing from the spirit and scope of the invention in its various aspects.

| REFERENCE SIGNS LIST: | | |
|---|---|---|
| 1a-1o Heads of each embodiment | 5a-5o Rotation/anti-rotation means of each embodiment | 7a-7o Visual indicators of each embodiment |
| 10 Nut | | |
| 12 Shaft | | |
| 14 sleeve | | |
| 16 Wedge | | |
| 20 Cut-out edges | | |
| 26 Wedge nut | | |

The invention claimed is:

1. An improved anchor bolt apparatus for installation in a surface, the improved anchor bolt comprising:
   a bolt having a head, connected to a shaft with an end;
   an improvement means in the head of the bolt, the improvement means including a visual indicator means including a plurality of visual elements, one of which is a slot of an adjustment means, the adjustment means including the at least one slot for adjustment of the bolt in the installation, and the visual indicator means including the at least one slot of the adjustment means and at least one other visual element; and
   an engagement means, associated with the shaft of the bolt, for engaging with or into the surface to install the bolt,
   wherein, the improved bolt apparatus is installed in a suitable hole in the surface, engaged by the engagement means, the visual indicator means enables characteristics of the bolt to be seen, the characteristics including the length of the shaft of the bolt, the adjustment means enables the bolt installation to be adjusted through rotation or anti-rotation, within the hole, and the visual indicator means and adjustment means can both be used at the time of installation and later, after the bolt has been installed to see the characteristics of the bolt including the length of shaft, and to adjust the installation of the bolt in the hole.

2. The improved bolt of claim 1, wherein the bolt head comprises cut-outs portions to assist to visually determine the characteristics of the bolt and reduce corrosion due to water sitting on head of the bolt.

3. The improved bolt of claim 1, wherein the improved bolt is an anchor bolt, expansion bolt or similar.

4. The improved bolt of claim 1, wherein the visual indicator means of the improvement mean indicates if the bolt is made of a high tensile material for uses demanding higher tensile strength.

5. The improved bolt of claim 1, wherein the improvement means comprises two or more slots.

6. The improved bolt of claim 1, wherein the slots of the visual indicator means indicate the length of the shaft of the bolt.

7. The improved bolt of claim 1, wherein one or more of the slots are used as the adjustment means or the adjustment means includes one or more slots.

8. The improved bolt of claim 1, wherein the visual indicator means includes two or more slots.

9. The improved bolt of claim 1, wherein the at least one slot of the improvement means provide both a visual indicator means of the characteristics of the bolt and also provides adjustment means for use with a tool to rotate or rotate back the bolt in the hole.

10. The improved bolt of claim 1, wherein the improvement means includes a system of slots, two short crossed indicating a shaft of less than 2 inches, a single long slot crossed by a short slot indicating a shaft of between 2 inches and 11 inches long, and a long single shaft indicating a shaft of greater than 11 inches, for example, 12 inches or longer.

11. The improved bolt of claim 1, wherein, the improvement means comprises a system of slots, two short crossed indicating a shaft of less than 2 inches, a single long slot indicating a shaft of between 2 inches and 11 inches long, and a short cross-slot indicating an additional half inch.

12. The improved bolt of claim 1, wherein the visual indicator means may include elements chosen from the group: lines; dots; arrows; chevrons; circles; irregular shapes; rectangular, including square; triangles; stars; and repeats or combinations of any of the foregoing.

13. The improved bolt of claim 1, wherein the visual indicator means comprises an arrow on a long slot at the 12 O'clock position to give orientation.

14. The improved bolt of claim 13, wherein the visual indicator means comprising more than one arrow indicates multiples of 12, so two arrows means the shaft length is 24 inches or greater and so on.

15. The improved bolt of claim 1, wherein the visual indicator means comprises one or more dots or holes.

16. The improved bolt of claim 15, wherein the one or more dots or holes indicate the length of the shaft e.g., at 3 O'clock to indicate a 3 inch length shaft.

17. The improved bolt of claim 1, wherein the visual indicator means comprises chevrons, and one pair of chevrons indicates a general use bolt and two pairs indicates the bolt is a high tensile strength bolt.

18. The improved bolt of claim 1, wherein the adjustment means comprises a recess for use with tools to adjust the installation of the bolt and enables accurate and aligned installation in the hole.

19. The improved bolt of claim 1, wherein the adjustment means enables rotation or anti-rotation of the bolt to enable an improved installation as adjusting the bolt within the hole tightens the installation.

20. The improved bolt of claim 1, further comprising visual cues indicating the bolt needs rotating or anti-rotating through use of the adjustment means, wherein the visual cues indicate that the visual indicator means are not in the expected alignment, signaling that adjustment is required.

21. A method of use of the improved anchor bolt of claim 1, the improved bolt comprising a head, shaft and an end, and the head of the bolt comprises at least one adjustment means, and an engagement means associated with the shaft, between the head and the end of the bolt, for engaging into a surface, the method comprising:
  i. forming a hole in the surface for receipt of the end and shaft of the bolt
  ii. positioning the bolt in the hole;
  iii. rotating the bolt in the hole to cause engagement of the engagement means with sides of the hole;
  iv. if necessary adjustment may occur through rotation or anti-rotation of the head of the bolt through use of a suitable tool in the adjustment means, whereby the installation can be adjusted to be a good fit.

22. A method of use of the improved anchor bolt of claim 1, the improved bolt comprising a head, shaft and an end, and wherein the head of the bolt including a readily recognisable visual indicator, and an engagement means, associated with the shaft, between the head and the end of the bolt, for engaging into a surface, the method including the following steps:
  i. installing the bolt in the surface;
  ii. inspecting the bolt head and observing the visual indicator;
  iii. discerning one or more characteristic of the installed bolt from the visual indicator.

\* \* \* \* \*